United States Patent Office 3,361,528
Patented Jan. 2, 1968

3,361,528
PURIFICATION OF ORTHOPHOSPHOROUS ACID
Chung Yu Shen, St. Louis, Mo., assignor to Monsanto Company, St. Louis, Mo., a corporation of Delaware
No Drawing. Filed Sept. 8, 1964, Ser. No. 395,040
11 Claims. (Cl. 23—165)

ABSTRACT OF THE DISCLOSURE

A process is described for removing color impurities from orthophosphorous acid containing such color impurities by contacting the acid with an oxidizing agent in amounts and under conditions which are sufficient to decolorize said acid without appreciably oxidizing said orthophosphorous acid to orthophosphoric acid.

This invention relates to a process for improving the purity of orthophosphorous acid and is directed to a process for preparing orthophosphorous acid which is substantially free of color impurities. Somewhat more particularly this invention provides a method for preparing orthophosphorous acid which yields a substantially color-free acid.

Orthophosphorous acid produced in the reaction of a phosphorus trihalide with a hydroxyl containing compound, such as water or a carboxylic acid, yields, under certain conditions, a product which is colored, particularly with a yellow or orange tint. Since it is advantageous that the orthophosphorous acid be substantially color-free for many of its uses, various methods have been heretofore suggested for removing such color bodies which impart color to the orthophosphorous acid. However, such color impurities appear to be extremely stable in the orthophosphorous acid thus rendering their removal difficult. For example, one such method has involved diluting the orthophosporous acid with water and heating it at elevated temperatures and for extended periods of time. None of the methods have been entirely satisfactory, generally because they have involved an undesirable expenditure of materials and time, and usually the finished product has not been improved greatly in color.

It is, therefore, an object of this invention to provide an improved process, which process obviates or minimizes the disadvantages of the prior art methods. It is another object of this invention to provide a method for the removal of color impurities from orthophosphorous acid whereby substantially colorless orthophosphorous can be produced. Further objects and advantages of this invention will become apparent from the following description.

In its broadest aspects the invention comprises treating the orthophosphorous acid containing color impurities with an oxidizing agent in order to prepare orthophosphorous acid which is substantially free of the color impurities, all of which will be more fully described hereinafter. The use of an oxidizing agent in this manner is believed to be unexpected due to the ease with which orthophosphorous acid can be oxidized to orthophosphoric acid. In theory at least, the color impurities are believed to be polymeric oxides of phosphorus and the effectiveness of the oxidizing agent is believed to be attributable to its action in preferentially attacking these polymeric oxides and thereby decomposing them in some measure at least to orthophosphorous acid.

Although orthophosphorous acid can be produced in the aforementioned reactions using, in general, any phosphorus trihalide as a reactant, such as phosphorus tribromide, phosphorus triiodide and the like, phosphorus trichloride appears to be the most advantageous phosphorus trihalide to use and, therefore, the instant invention is primarily directed to the use of phosphorus trichloride as the preferred reactant.

As previously mentioned, the color impurities are usually present in orthophosphorous acid produced in the reaction of phosphorus trichloride, a hydroxyl containing compound such as water or a carboxylic acid. When water is used as one of the reactants, the reaction (hydrolysis) is carried out at a temperature below about 200° C., preferably from about 50° C. to 150° C., and the phosphorus trichloride reactant is used in excess amounts, that is, amounts which are in excess of stoichiometry for the reaction, in order that high concentrations and/or yields of orthophosphorous acid are obtained. In some cases it may be advantageous to carry out the reaction in the presence of an orthophosphorous acid medium in the manner as described in U.S. Patent 2,595,198.

For the reaction of a carboxylic acid and phosphorus trichloride, excess amounts of phosphorus trichloride, that is, amounts which are in excess of stoichiometry for the reaction, are used in order to increase the yields of the products and preferably excess amounts of from about 25% to 100% by weight with, in general, the shorter the chain length of the carboxylic acid the larger the excess of phosphorus trichloride required. Temperatures from about 20° C. to about 120° C. are quite suitable with temperatures below about 70° C. being preferred. In general, the reaction can be carried out by treating a liquid or molten carboxylic acid with phosphorus trichloride with or without agitation for a period of from about 30 minutes to about 3 hours and allowing the reaction products to separate into two layers. The upper layer, that is, the carboxylic acid chloride is thus separated from the lower layer, that is, orthophosphorous acid and, in some instances, pyrophosphorous acid and/or excess phosphorus trichloride. In general, any carboxylic acid can be used, and, in particular, carboxylic acids containing from 1 to about 24 carbon atoms, which includes acetic acid, propionic acid, n-butyric acid, n-valeric acid, n-hexanoic acid, n-octanoic acid, n-decanoic acid, n-dodecanoic acid, n-tetradecanoic acid, n-hexadecanoic acid, n-octadecanoic acid, dodecenoic acid, tetradecenoic acid, hexadecenoic acid, octadecenoic acid, and the like, including mixtures of the foregoing.

In general, by following the teachings herein any concentration of orthophosphorous acid containing the color impurities can be treated, such as from about 10% concentration to concentrations in excess of 100% and which contain orthophosphorous acid and condensed phosphorous acids, although usually such an acid, as commercially produced, is over about 50% concentrated and, especially from about 70% to 100% concentrated and, therefore, such are preferred for use in the instant invention.

In general, any oxidizing agent which functions in acidic solutions can be used and, in particular, strong oxidizing agents including organic as well as inorganic oxidizing agents. As examples, the following are included: hydrogen peroxide and its addition compounds, including the hydroperoxides and peroxide compounds, such as the peroxide of sodium and the superoxide of potassium, urea percompounds, perborates, and the per acids such as persulfuric acid, per acetic acid, peroxy monophosphoric acid and their water-soluble salt compounds such as sodium, potassium, ammonium and organic amine salts. Also included are such inorganic oxidizing agents as the halogens (fluorine, chlorine, bromine and iodine) and especially chlorine as $Cl_2$ or nascent chlorine $Cl$, the acid and water- color was also measured. The following table lists the results of the test:

TABLE I

| Oxidizing Agent | Amount of Oxidizing Agent (Percent) | 25° C. | | 50° C. | | 100° C. | |
|---|---|---|---|---|---|---|---|
| | | Percent $PO_4$ | Time | Percent $PO_4$ | Time | Percent $PO_4$ | Time |
| (1) Hydrogen peroxide | .1 | Neg. | <10 min | <1 | <5 min | 3 | 5 min |
| (2) Hydrogen peroxide | .03 | Neg. | 15 min | <1 | 10 min | 3 | 30 min |
| (3) Nitric acid | .5 | Neg. | 16 hrs | 2-5 | 60 min | 20 | 5 min |
| (4) Hypochlorite (sodium salt) | .1 | 2-5 | 6 hrs | | | | |
| (5) Chorate (sodium salt) | .1 | Neg. | 10 hrs | 1-3 | 20 min | 5 | 5 min | soluble salts containing oxygenated anions, such as $NO_3^-$, $SeO_4^-$, $MnO_4^-$, and especially the oxygenated halide anions such as $ClO_3^-$, $BrO_3^-$, $IO_3^-$, $ClO_4^-$ $ClO^-$, and the like, and particularly the alkali metal salts, such as sodium, potassium, lithium and the like, and the ammonium salts. Additionally included are the water-soluble hexapositive chromium compounds which include chromic acid, the alkali metal chromates and dichromates, such as sodium, potassium, lithium chromates and dichromates and the like, the alkaline earth metal chromates and dichromates, such as magnesium, calcium, strontium chromates and dichromates and the like, including mixtures of the foregoing. When using the chromates and dichromates, it is preferred that such be used with a strong inorganic acid, particularly sulfuric acid, and preferably on about a mole per mole basis. The oxidizing agents which are preferred are hydrogen peroxide, the alkali metal salts of the oxygenated halides, and nitric acid, with hydrogen peroxide being particularly preferred.

In general, amounts of the oxidizing agent which are suitable for use in practicing the present invention vary with, among other things, the amount of color impurities present and the concentration of the orthophosphorous acid, and amounts should be used which, while being effective in producing orthophosphorous acid substantially free of color bodies, does not oxidize the phosphorous acid to phosphoric acid to an appreciable extent. Usually amounts of from about 0.01 to about 1 percent by weight of orthophosphorous acid are suitable and preferably from about .03 to about .1 percent by weight.

In general, the orthophosphorous acid, containing the color impurities, in liquid or molten form need only be contacted with the oxidizing agent in order to yield a substantially color-free acid although admixing and vigorous agitation and the like are preferred in order to effect intimate contact between the oxidizing agent and the color impurities. Such treatment can be carried out at various temperatures with usually temperatures from about 20° C to 100° C. being suitable in some cases, although at higher temperatures there appears to be a tendency for the oxidizing agent to oxidize the orthophosphorous acid to orthophosphoric acid and therefore temperatures below about 50° are especially preferred. Times required to effect the purification vary with the amount and type of oxidizing agent used, amount of impurity present and the like, and, in general, times from about a few minutes, that is, about 5 minutes, to a few hours, that is, about 6 hours, are usually sufficient.

The following example is presented to illustrate the invention, with parts and percentages by weight being used unless otherwise indicated.

*Example*

About 10 ml. samples of orthophosphorous acid (about 70% concentration) containing about 1% of an orange colored material was mixed with various oxidizing agents as indicated and in amounts and at various temperatures as indicated in the following table. The percent of phosphoric acid based on total phosphorus after treatment was determined by analysis of the $P^{31}$ n.m.r. spectra of the orthophosphorous acid. The time necessary for the orthophosphorous to become substantially free of the orange The above data dramatically illustrates the ability of the present invention to decolorize orthophosphorous acid containing color impurities and, as can be observed therefrom, the oxidizing agents were used in minor amounts, that is, from about .03% to .1% by weight of orthophosphorous acid in order to effect the removal of the color impurities.

What is claimed is:

1. A process for removing color impurities due to polymeric oxides of phosphorus from orthophosphorous acid containing such color impurities comprising contacting said acid with an oxidizing agent in amounts and under conditions which are sufficient to decolorize said acid without appreciably oxidizing said orthophosphorous acid to orthophosphoric acid.

2. The process of claim 1, wherein said oxidizing agent is selected from the group consisting of hydrogen peroxide, the alkali metal salts of the oxygenated halides, and nitric acid.

3. The process of claim 2, wherein said oxidizing agent is used in amounts from about .03 to about .1% by weight of said acid.

4. The process of claim 3, wherein said oxidizing agent is hydrogen peroxide.

5. The process of claim 4, wherein said acid is contacted with said hydrogen peroxide at temperatures from about 20° C. to about 50° C.

6. In the method wherein orthophosphorous acid containing color impurities due to polymeric oxides of phosphorus is prepared by the reaction of a phosphorus trihalide and a hydroxyl containing reactant selected from the group consisting of water and carboxylic acids, the improvement which comprises contacting said orthophosphorous acid containing said color impurities with an oxidizing agent in amounts and under conditions which are sufficient to decolorize said acid without appreciably oxidizing said orthophosphorous acid to orthophosphoric acid.

7. In the method of claim 6, wherein said phosphorus trihalide is phosphorus trichloride.

8. In the method of claim 7, wherein said oxidizing agent is selected from the group consisting of hydrogen peroxide, alkali metal salts of the oxygenated halides, and nitric acid.

9. In the method of claim 8, wherein said oxidizing agent is used in amounts from about .03 to about .1% by weight of said acid.

10. In the method of claim 9, wherein said oxidizing agent is hydrogen peroxide.

11. In the method of claim 10, wherein said acid is contacted with said hydrogen peroxide at temperatures from about 20° C. to about 50° C.

References Cited

UNITED STATES PATENTS 1,856,144  5/1932  Wietzel et al. _____ 23—165
1,981,145  11/1934  Keller _____ 23—165
2,600,813  6/1952  Tidwell _____ 23—165

OSCAR R. VERTIZ, *Primary Examiner.*

A. J. GREIF, *Assistant Examiner.*